(No Model.)
T. B. BLOSSER.
DEVICE FOR APPLYING RUBBER TIRES TO WHEELS.
No. 590,085. Patented Sept. 14, 1897.
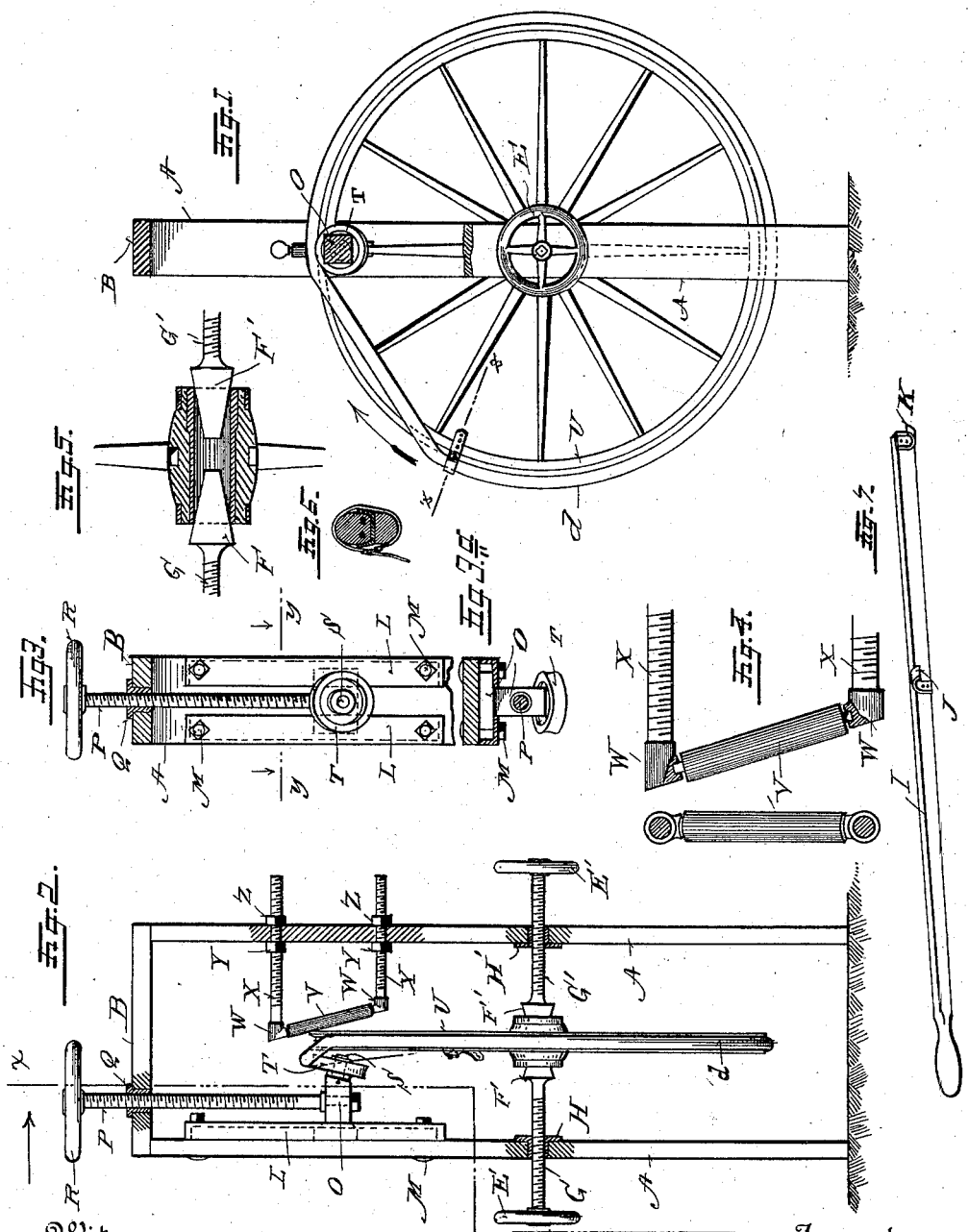
Witnesses
Jas. C. Dawley
W. M. McNair
Inventor
Theodore B. Blosser
By his Attorney
H. A. Toulmin

UNITED STATES PATENT OFFICE.

THEODORE B. BLOSSER, OF SPRINGFIELD, OHIO, ASSIGNOR TO THE VICTOR RUBBER TIRE COMPANY, OF SAME PLACE.

DEVICE FOR APPLYING RUBBER TIRES TO WHEELS.

SPECIFICATION forming part of Letters Patent No. 590,085, dated September 14, 1897.

Application filed February 27, 1897. Serial No. 625,371. (No model.)

*To all whom it may concern:*

Be it known that I, THEODORE B. BLOSSER, a citizen of the United States, residing at Springfield, in the county of Clark and State of Ohio, have invented certain new and useful Improvements in Devices for Applying Rubber Tires to Vehicles, of which the following is a specification, reference being had therein to the accompanying drawings.

This invention relates to certain new and useful improvements in devices for applying rubber tires to vehicle-wheels, especially when great pressure is required to seat the tire in the channel-iron which is used on such wheels.

In applying rubber tires to vehicles it has heretofore been a serious question how to put them on with great enough pressure to prevent the tire from rolling out of the channel-iron when the varying strains, due to unevenness of roadways and rapid travel around bends and sharp turns, were brought to bear upon them. This result I have accomplished with my invention.

In the accompanying drawings, on which like reference-letters indicate corresponding parts, Figure 1 is a side elevation of a wheel, showing the rubber tire partly out of the channel-iron and a sectional view of my apparatus taken on the line x x of Fig. 2. Fig. 2 is a front elevation partly in section; Fig. 3, an enlarged detail view of the adjustable tire-guide mechanism; Fig. 3ª, a detail sectional view on the line z z of Fig. 3; Fig. 4, detail views of the roller-bearing for the wheel-rim when applying the rubber tire; Fig. 5, a detail view of the adjustable wheel-supports; Fig. 6, a detail sectional view of the wheel rim, tire, and clamp on the line z z of Fig. 1; and Fig. 7, a perspective view of a lever used for revolving the wheel.

The letter A designates stout upright bars suitably secured to the floor or base and connected at their upper ends by a cross-piece B. In these uprights are mounted screw-threaded shafts G and G', fitted in threaded thimbles or bushings H and H' and having, respectively, hand-wheels E and E', by which said shafts are rotated, so as to adjust them in and out and bring their conical ends F and F' properly within the bore or box of the various-sized wheels upon which tires are to be placed. In Fig. 5 these conical ends are well shown extending within the hub of a wheel. Thus the wheel is well supported and may be revolved by hand, as by taking hold of the rim and spokes, or by applying to the wheel a type of lever shown in Fig. 7, which is used when additional leverage or power is required to revolve the wheel when the final part of the tire is being applied to the wheel, at which time the tires are undergoing a very high strain or tension. This lever is composed of a bar I, with hooks J and K to engage the spokes.

In the upper part of the frame I mount at one side the adjustable tire-guiding mechanism and at the other side an adjustable wheel-bracing device. The former mechanism consists of ways L, secured to one of the uprights A by bolts M, and a block O, slidable in said ways, with a screw-threaded shaft P rotatably connected with the block and extending up through a threaded bushing Q in the cross-bar B and having a hand-wheel R. The block O carries a stud-shaft S, on which is mounted a grooved pulley T, which I term the "tire-guiding" pulley. By manipulating the hand-wheel R the pulley T is adjusted so that its upper part is about level with the upper edge of the channel-iron of the wheel to which the tire is to be applied, such a wheel is indicated at U in Fig. 2.

The wheel-bracing devices consist of a roller V, whose end spindles are mounted in blocks W, supported by a screw-threaded rod X, mounted in one of the uprights A. Jam-nuts on one side and jam-nuts Z on the other side of said upright hold these rods at adjusted positions—namely, with the roller V against the channel-iron or rim of the wheel to which the tire is to be applied. Such position varies somewhat with different-sized wheels.

Having thus fully described my invention, what I claim as new, and desire to secure by Letters Patent, is—

1. In an apparatus for applying rubber tires to vehicle-wheels, the combination with a frame or fixed structure composed of uprights and a cross-piece, adjustable wheel-supports mounted in the uprights, and a wheel-guide mounted in one of the uprights, ways on the other upright, a slidable block in the ways, a screw-threaded shaft to adjust the block, and a pulley carried by the block alongside of the wheel-rim and adjustable from a point beneath the wheel-rim thence outward and adapted to draw outward on the rubber tire and to shift it laterally over onto the vehicle-wheel.

2. In an apparatus for applying rubber tires to vehicle-wheels, the combination with a frame or fixed structure consisting of uprights and a cross-piece, adjustable wheel-supports composed of threaded rods mounted in the uprights, an adjustable wheel-brace composed of threaded rods mounted in one of the uprights and having an inclined anti-friction-roller, ways mounted on the other upright, a slidable block in said ways, a pulley secured by the block and inclined to the vehicle-wheel, and a threaded shaft to adjust the block.

3. In an apparatus for applying rubber tires to vehicle-wheels, the combination with a frame or fixed structure, of wheel-supports, a tire-guiding mechanism carrying a pulley inclined to the vehicle-wheel when mounted on said supports, said mechanism and supports being relatively adjustable to bring said pulley substantially level with the flange of the channel-iron of the said wheel.

In testimony whereof I affix my signature in presence of two witnesses.

THEODORE B. BLOSSER.

Witnesses:
W. M. McNAIR,
OLIVER H. MILLER.